US011489787B2

(12) United States Patent
Bhagavatula et al.

(10) Patent No.: US 11,489,787 B2
(45) Date of Patent: Nov. 1, 2022

(54) CENTRALLY MANAGED TIME-SENSITIVE FOG NETWORKS

(71) Applicant: NEBBIOLO TECHNOLOGIES INC, Milpitas, CA (US)

(72) Inventors: Ravi Bhagavatula, Milpitas, CA (US); Pankaj Bhagra, Milpitas, CA (US)

(73) Assignee: TTTECH INDUSTRIAL AUTOMATION AG, Vienna (AT)

( * ) Notice: Subject to any disclaimer, the term of this patent is extended or adjusted under 35 U.S.C. 154(b) by 0 days.

(21) Appl. No.: 17/135,991

(22) Filed: Dec. 28, 2020

(65) Prior Publication Data
US 2021/0119933 A1    Apr. 22, 2021

Related U.S. Application Data

(63) Continuation-in-part of application No. 15/687,396, filed on Aug. 25, 2017, now abandoned.

(51) Int. Cl.
*H04L 47/78* (2022.01)
*H04L 47/80* (2022.01)

(52) U.S. Cl.
CPC .......... *H04L 47/781* (2013.01); *H04L 47/805* (2013.01)

(58) Field of Classification Search
CPC ......... H04W 4/38; H04W 4/70; H04W 4/023; G06F 9/50; G06F 9/5061; H04L 67/289
See application file for complete search history.

(56) References Cited

U.S. PATENT DOCUMENTS

| 10,243,878 | B2 * | 3/2019 | Byers | H04W 4/38 |
| 2013/0254407 | A1 * | 9/2013 | Pijewski | H04L 67/1012 |
| | | | | 709/226 |
| 2013/0290539 | A1 * | 10/2013 | Kodialam | G06F 9/5072 |
| | | | | 709/226 |
| 2014/0228978 | A1 * | 8/2014 | Neubert | G06F 8/30 |
| | | | | 700/18 |
| 2015/0043382 | A1 * | 2/2015 | Arora | H04L 41/122 |
| | | | | 370/254 |

(Continued)

*Primary Examiner* — Mahran Y Abu Roumi
(74) *Attorney, Agent, or Firm* — Barry Choobin; Patent 360 LLC

(57) ABSTRACT

The present disclosure envisages optimization of a time-sensitive fog network deployed in an industrial environment. The time-sensitive fog network comprises a plurality of fog nodes communicably coupled to a plurality of industrial equipments referenced as endpoints. Each fog node is embodied with a plurality of computer-based resources including computational resources, storage resources, security resources, network resources, application-specific resources, and device-specific resources. The resource constraints that warrant the endpoints to cooperate with specific fog nodes to access specific resources are manifested as a compute profile, a storage profile, a security profile, a network profile, an application-specific profile, and a device-specific profile. The endpoints are optimally provisioned to cooperate with the fog nodes and consume the computer-based resources embodied therein, based on a deployment model that optimally and deterministically correlates the plurality of computer-based resources embodied in each of the fog nodes to the resource profiles attributed to each of the endpoints.

8 Claims, 4 Drawing Sheets

(56) References Cited

U.S. PATENT DOCUMENTS

| | | | |
|---|---|---|---|
| 2015/0249586 A1* | 9/2015 | Byers | H04L 43/0805 |
| | | | 709/224 |
| 2016/0164728 A1* | 6/2016 | Chakrabarti | H04L 41/0806 |
| | | | 370/254 |
| 2016/0182639 A1* | 6/2016 | Hong | H04L 67/10 |
| | | | 709/201 |
| 2017/0048308 A1* | 2/2017 | Qaisar | H04L 41/40 |
| 2017/0244601 A1* | 8/2017 | Byers | H04L 67/12 |
| 2017/0277173 A1* | 9/2017 | Bonomi | G06Q 50/04 |
| 2017/0288988 A1* | 10/2017 | Pignataro | H04W 12/122 |
| 2017/0303215 A1* | 10/2017 | Kim | H04W 52/383 |
| 2017/0366472 A1* | 12/2017 | Byers | H04L 67/289 |
| 2018/0024537 A1* | 1/2018 | Chauvet | H04L 63/20 |
| | | | 718/104 |
| 2018/0115519 A1* | 4/2018 | Bonomi | H04L 63/1458 |
| 2018/0309662 A1* | 10/2018 | Clarke | H04L 45/70 |
| 2018/0321356 A1* | 11/2018 | Kulkarni | H04W 64/003 |
| 2019/0116241 A1* | 4/2019 | Bonomi | H04L 67/62 |
| 2020/0050494 A1* | 2/2020 | Bartfai-Walcott | G06F 9/5083 |
| 2020/0319925 A1* | 10/2020 | Clampitt, III | G06F 9/45558 |

* cited by examiner

CENTRALLY MANAGED TIME-SENSITIVE FOG NETWORKS

CROSS-REFERENCE TO THE RELATED APPLICATIONS

This application is a continuation-in-part (CIP) of the U.S. patent application Ser. No. 15/687,396, filed on Aug. 25, 2017.

BACKGROUND

Technical Field

The present disclosure is related to network management. Particularly, the present disclosure is related to the management of time-sensitive fog networks. More particularly, the present disclosure is related to a time-sensitive fog network embodying a centrally managed lead fog node configured to facilitate centralized hosting of services, application hosting, and role based access control inter-alia.

Description of the Related Art

Fog computing is defined as a distributed computing paradigm that extends the computational power and the data analytics applications to the 'edge' of a computing network. A fog computing model could be equated to a local cloud that promotes unhindered access and control of the data stored therein anytime, anywhere, and in any manner. The phenomenon of fog computing fulfills the need to relocate the computing, storage, and network communication services closer to the terminal devices (located typically at the edges of a computer network) which are deemed the consumers of the computing, storage, and network communication services. Fog computing typically finds its use in industries such as power plants, oil and gas rigs, high-end data centers and the like. Fog computing, as specified above, is built on the phenomenon of 'local' distributed resource management, wherein allocation of resources, viz. computational resources, storage resources, network resources, device specific resources, application resources and security resources, are managed in a distributed manner across a local computing environment, thereby ensuring continued availability of the computational resources to the requesting terminal devices and also ensuring that the data/information generated by these requesting terminal devices is always processed in proximity thereof Interconnected terminal devices typically include industrial equipments such as robots, Computer Numeric Controlled (CNC) machines, manufacturing equipments, power management devices, air handlers, coolant circulating pumps, and sensors and actuators embedded within any such industrial equipments. Such industrial equipments often entail creation of large volumes of data, which is typically transmitted to cloud-based servers for storage and further analysis. An increase in the number of industrial equipments deployed in an industrial environment brings about a consequential increase in the amount of data created and transmitted to the cloud-based servers for storage and analysis. The phenomenon of fog computing, by envisaging local proximity processing, i.e., facilitating local computing and storage abilities, has emerged as an effective mechanism for increasing the efficiency and effectiveness of the industrial equipments as well as the cloud computing environment, without any major structural, hierarchical, and functional modifications to the industrial environment.

A typical fog network incorporates a plurality of fog nodes (FN) which are communicably coupled to the industrial equipments. The industrial equipments, in turn, are typically referred to as endpoints of the fog network, for they are located preferably at the edges of the fog network. The fog nodes embodied within the fog network facilitate an increase in the local computing and storage capabilities, thereby sharing a larger percentage of the processing load that would otherwise have been stored and processed by the cloud-based servers, and reducing network traffic, network delays, data storage and transmission bottlenecks. Typically, fog nodes function as a bridge between traditional cloud-computing environment and the industrial environment comprising the industrial equipments. Typically, fog nodes function as a bridge between a cloud layer (i.e., the cloud computing environment) and a terminal layer (i.e., the industrial equipments and the traditional computer network interconnecting the industrial equipments). Fog nodes are typically positioned in proximity to the industrial equipments which generate large volumes of processable data, so that they, at least metaphorically, bring the data storage and computing facilities closer to the industrial equipments, and thereby reduce data transmission and storage overhead, improve application response speed, and improve network resources utilization. Fog nodes typically connect to a plurality of industrial equipments and receive, process the data generated by the industrial equipments, which, in the absence of fog nodes, would have been forwarded to remote cloud-based servers for analysis and storage. Fog nodes are typically interconnected via a time-sensitive network (TSN) and each of the fog nodes essentially incorporates at least one TSN switch (also referred to as a time-sensitive switch), which, in turn, facilitates transmission of data generated by the industrial equipments across the time-sensitive network and between the various fog nodes for at least the purposes of analysis and storage. An exemplary scenario described herein below incorporates a deployment model executable in an industrial environment for manual deployment of a robot, a programmable logic controller (preferably, a soft programmable logic controller embedded within a first virtual machine), and a streaming analytics engine (also embedded within a second virtual machine). In accordance with this exemplary scenario, the computational resources, storage resources, network resources, and security resources necessary for the functioning of the robot, programmable logic controller (PLC), and streaming analytics engine are distributed across and controlled by various fog nodes interconnected via the time-sensitive network. And, in accordance with this exemplary scenario, firstly, the robot is identified, followed by manually identification and setting up of the computational resources and storage resources, and manual provisioning the network resources and security resources to collaborate with the computational resources and the storage resources. However, one of the major drawbacks associated with the manual deployment of the robot, the programmable logic controller (PLC), and the streaming analytics engine is that any inconsistencies or inadvertent errors in the manual identification and setup of computational resources and storage resources, and manual provisioning of the network resources and security resources results in a sub-optimal deployment, which, in turn, may entail disadvantageous consequences including a need for repetitive human intervention, breakdown of the deployment model in entirety, inappropriate provisioning of the resources vis-à-vis the resource related requirements attributed to the robot, the programmable logic controller (PLC), and the streaming analytics engine, network delay, repetitive and frequent re-evaluation and reassignment of the available resources inter-alfa.

The manual deployment of the robot, programmable logic controller (PLC), and streaming analytics engine, and the manual identification and setup of computational resources and storage resources, and manual provisioning of the network resources and security resources, as described above, may metamorphose into a sub-optimal deployment, wherein the manually identified computational resources may not be adequate to accommodate the requirements attributed to the streaming analytics engine. Additionally, the physical location of the manually identified computational resources might entail significant network transmission delays, when the computational resources are communicably coupled to the streaming analytics engine and the programmable logic controller. Further, the versions of firmware, applications executed on the streaming analytics engine and the programmable logic controller may not be compatible with the manually identified and provisioned computational resources, storage resources, network resources and security resources. Further, the manually identified and provisioned computational resources, storage resources, network resources and security resources may have to be re-evaluated and reassigned in the event of interruption in the functioning of either the robot or the programmable logic controller, or the streaming analytics engine.

Therefore, in view of the aforementioned drawbacks associated with the deployment model entailing manual deployment of industrial equipments and resources, there was felt a need for an improved deployment model that automatically generates optimized solutions in terms of the programmatic deployment of computational resources, storage resources, network resources, and security resources for multitude of deployment scenarios involving industrial equipments and resources. Further, there was also felt a need for a computer-implemented system that programmatically differentiates between static deployment related constraints and modifiable deployment related constraints (constraints attributed to the computational resources, storage resources, network resources, and security resources) and optimizes the deployment model based only on the iterable constraints, while honoring the requirement that the static deployment related constraints are not to be modified.

Further, there was also felt a need for a deployment model that was responsive to iterative changes in the deployment related constraints. Further, there was also felt a need for a deployment model that responds to the onset of high availability (HA) events and iteratively optimizes at least some of the deployment related constraints to address the high availability events. Further, there was also felt a need for a deployment model that selectively 'turns on' predetermined fog nodes to enable a communication there between, vis-à-vis traditional deployment models which emphasized on maintaining the fog nodes always in an 'on' state, and accordingly disallowed communication between predetermined fog nodes based on the corresponding admission control (AC) policies. Further, there was also felt a need for a deployment model that provides fine-grained Quality of Service (QoS) to the fog nodes constituting the fog network.

OBJECTS

An object of the present disclosure is to envisage a deployment model that provisions a plurality of computational resources, storage resources, network resources, and security resources in an end-user transparent manner.

Yet another object of the present disclosure is to envisage a deployment model that programmatically matches the available computational resources, storage resources, network resources, and security resources, against the resource requirements attributed to an endpoint (industrial equipment), before initiating resource allocation.

Still a further object of the present disclosure is to envisage an iterative, constraint-optimized deployment model that provisions the available resources in line with the requirements attributed to an endpoint (industrial equipment), by categorizing the requirements into a plurality of resource profiles and programmatically linking such resource profiles to the best fit computational resources, storage resources, network resources, and security resources.

One more object of the present disclosure is to envisage a deployment model that provides an optimized resource allocation solution from the point of view of both a resource pool embodying computational resources, storage resources, network resources, and security resources, and the industrial equipments and applications requesting access to the resource pool.

Yet another object of the present disclosure is to envisage a deployment model that allows for resource profiles to be iteratively modified and the resource pools to be programmatically provisioned for each of the iterative changes brought upon the resource profiles.

Still a further object of the present disclosure is to envisage a deployment model that provisions the resource pools by taking into account the iterations occurring upon the resource profiles, as well as the static, predetermined, predefined resource requirements hardcoded into the resource profiles.

Another object of the present disclosure is to envisage a deployment model that automates the provisioning of the resource pools to the corresponding resource profiles, and facilitates automated re-provisioning of the resource pools in response to the iterative modifications of the resource profiles.

One more object of the present disclosure is to envisage a deployment model that is responsive to high availability (HA) events and programmatically re-calibrates the provisioning of the resource pools to the resource profiles in response to the occurrence of high availability events.

Another object of the present disclosure is to envisage a deployment model that takes into account the dynamicity of the endpoints attributed with the resource profiles, while provisioning the resource pools to the resource profiles.

Yet another object of the present disclosure is to envisage a deployment model incorporating admission control (AC) policies that maintain the endpoints in an always-off state, and programmatically turn-on the communication between specific endpoints based on a mapping of the resource pools and the resource profiles.

Yet another object of the present disclosure is to envisage a deployment model that provides fine-grained Quality of Service (QoS) to the endpoints by attributing deterministic upper bounds of latency, high priority (HP) treatment, and guaranteed maximum bandwidth to the intercommunication between the endpoints.

SUMMARY

The present disclosure envisages optimization of a fog network deployed in an industrial environment. The fog network typically incorporates a plurality of industrial equipments referenced as endpoints, and a plurality of fog nodes communicably coupled to the endpoints. In accordance with the present disclosure, the fog nodes as well as the endpoints are time-aware and exhibit a common sense of time. Therefore, the fog-network incorporating such time-aware fog nodes and endpoints is referred to as a time-sensitive fog network. The industrial equipments are referred to as endpoints since they are located preferably at the edge of the fog network. Further, each of the fog nodes are embodied with computational resources, security resources, network resources, application-specific resources, device-specific resources, and storage resources that are consumed by the endpoints and more particularly the software-driven applications executed at the endpoints to implement predefined functionalities and generate pre-designated industrial output. In the process of generating pre-designated industrial output, the endpoints and the applications executed thereon also generate processable and actionable data that, in turn, could be used inter-alia to monitor in real-time the performance and efficacy of each of the endpoints, and to draw real-time conclusions on the behavior of each of the endpoints.

Preferably, the time-sensitive fog network envisaged by the present disclosure is based on the Ethernet. The fog nodes embodied within the time-sensitive fog network are provided with a limited area of coverage. Preferably, each of the fog nodes incorporates at least one time-sensitive network switch. In addition to the time-sensitive network switch and the computational resources, security resources, network resources, application-specific resources, device-specific resources, and storage resources, each of the fog nodes also incorporates at least one server for processing the data generated by the industrial equipments executing (software-driven) applications. The present disclosure also envisages a computer-implemented deployment model that optimizes allocation of resources to the endpoints such that the endpoints are rendered immune to performance-related inconsistencies including network delays and breakdowns.

In accordance with the present disclosure, a fog node amongst the plurality of fog nodes is selected as the lead fog node (LFN). Preferably, a particular fog node is selected as the lead fog node based on well-known fog location models, which, in turn, may consider the number of servers hosted by each fog node for processing the data generated by the industrial equipments, the location of each of the fog nodes (and, in turn, the location of the servers embedded within the respective fog nodes), the architecture of the fog network, the reachability of each of the fog nodes from the remaining fog nodes, and the like, as the parameters for determining the suitability of each fog node to the role of lead fog node.

In accordance with the present disclosure, each of the fog nodes is assigned the computational resources, network resources, security resources, and storage resources, for processing, inter-alia, the data generated by the industrial equipments and applications, and for facilitating the implementation of the functionalities pre-assigned to the industrial equipments and applications. Each fog node, in accordance with the present disclosure, transmits to the lead fog node, information on the computational resources, network resources, security resources, and storage resources assigned thereto. Subsequently, the lead fog node, as a part of implementing the said deployment model, analyzes the resources-related information received from each of the fog nodes and virtually segregates the fog nodes and the different resources attributed thereto into a plurality of service-specific clusters referred to as resource pools. For example, the computational resources and, in turn, the fog nodes embodying the said computational resources are segregated into a 'compute pool', whereas the security resources and, in turn, the fog nodes embodying the said security resources are segregated into a 'security pool'.

In accordance with the present disclosure, on similar lines, the lead fog node creates a 'storage pool' (i.e., virtual segregation of the storage resources and, in turn, the fog nodes embodying the said storage resources), a 'device pool' (i.e., virtual segregation of device-specific resources and, in turn, the fog nodes embodying the said device-specific resources), an 'application pool' (i.e., virtual segregation of application-specific resources and, in turn, the fog nodes embodying the said application-specific resources), and a 'network pool' (i.e., grouping of the network resources satisfying the latency requirements of endpoints and, in turn, the fog nodes embodying the said network resources).

Subsequently, the latency requirements, storage requirements, application requirements, device requirements, network requirements, and security requirements attributed to the time-sensitive endpoints are manifested as respective resource constraints. Further, the lead fog node represents the resource constraints as corresponding resource profiles. Essentially, resource profiles of time-sensitive endpoints respectively describe the quantum of the computational resources, network resources, security resources, application specific resources, device specific resources and storage resources required at any given fog node for the implementation of the functionalities of the time-sensitive endpoints and also for processing the data generated by the time-sensitive endpoints.

In accordance with the present disclosure, the resource profiles envisaged by the present disclosure include a compute profile, a network profile, a security profile, an application profile, a device profile, and a storage profile. As the name suggests, the compute profile describes the quantum of the computational resources necessitated by a time-sensitive endpoint. Likewise, the network profile describes the latency requirement attributed to the time-sensitive endpoint. Similarly, the security profile describes the access permissions assigned to the time-sensitive endpoint, while the application profile describes the application types compatible with the time-sensitive endpoint. Likewise, the device profile describes the type of devices compatible with the time-sensitive endpoint, and the storage profile describes the amount of storage space required by the time-sensitive endpoint.

Subsequently, the lead fog node programmatically compares the constituents of each of the resource pools, i.e., the computational resources of the compute pool, the network resources of the network pool, the security resources of the security pool, the storage resources of the storage pool, the application-specific resources of the application pool, and the device types of the device pool, with the resource profiles (i.e., the compute profile, the network profile, the security profile, the application profile, the device profile, and the storage profile) of each of the time-sensitive endpoints, and identifies a fog node that best fits each of the resource profiles of each of the time-sensitive endpoints. While it is possible that different fog nodes and the resources embodied therein fulfill different resource profiles attributed to a time-sensitive endpoint in a mutually exclusive manner, the lead fog node automatically provisions each such fog node in a time-sensitive manner.

In accordance with the present disclosure, the deployment model renders the lead fog node responsive to the categorization of some of the resource constraints, i.e., some of the latency requirements, storage requirements, application requirements, device requirements, network requirements, and security requirements, as dynamic and the remaining resource constraints as static. The lead fog node is selectively configured—by way of implementation of the deployment model thereon—to prioritize dynamic resource constraints over the static resource constraints and optimize the process of data processing solely based on the dynamic resource constraints. Alternatively, the lead fog node is configured to prioritize static resource constraints over the dynamic resource constraints and optimize the process of data processing solely based on the static resource constraints.

The present disclosure also envisages a computer-implemented method for the selection of a lead fog node from among a plurality of fog nodes, and for triggering the lead fog node to execute the deployment model and the above-mentioned functionalities attributed to the lead fog node. The present disclosure also envisages a computer-readable storage medium that stores the computer-executable instructions necessary for triggering the selection of a lead fog node from among the plurality of fog nodes, and for triggering the programmatic execution of the deployment model and the functionalities attributed to the lead fog node.

DETAILED DESCRIPTION

Figure 1:
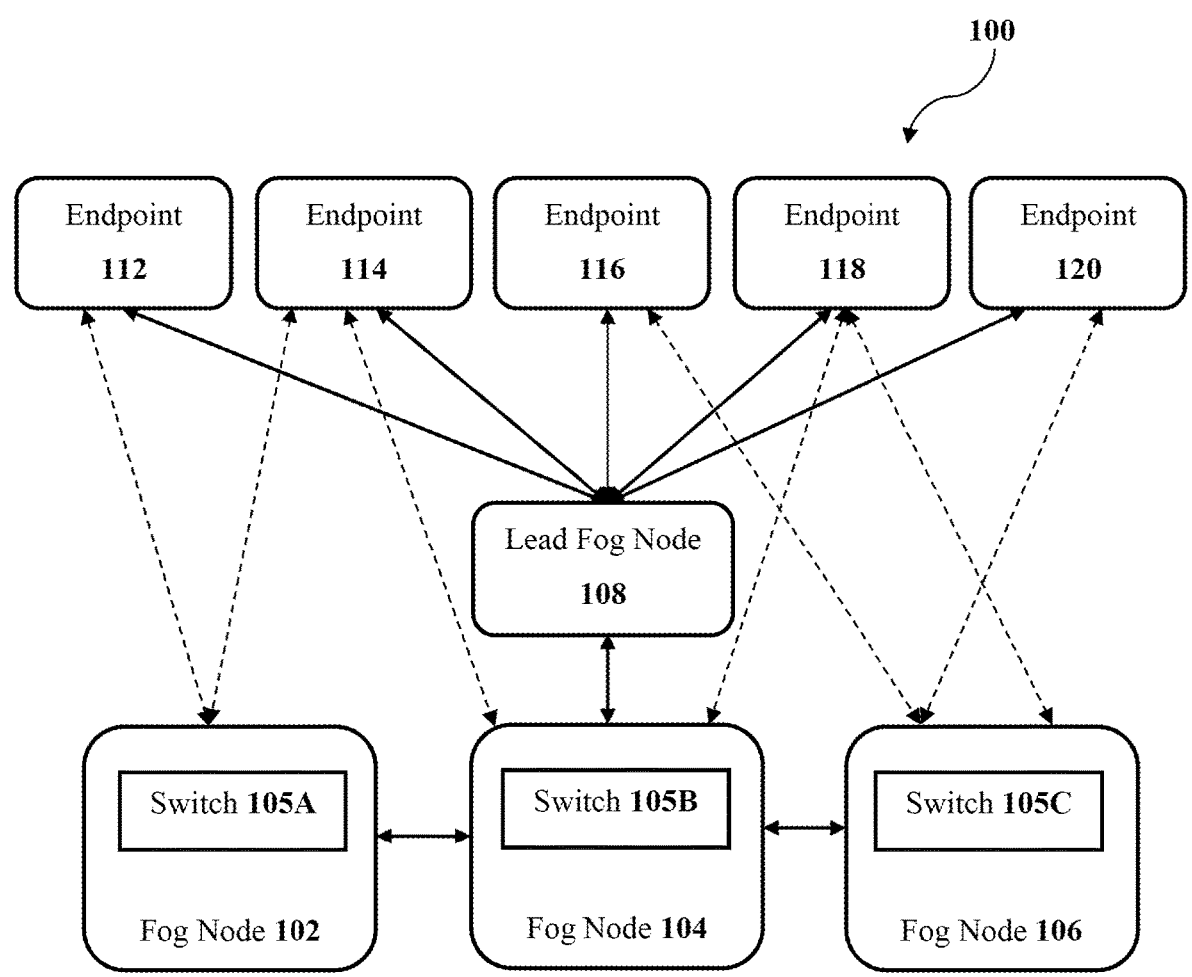
FIG. 1 illustrates an exemplary time-sensitive fog network in accordance with the present disclosure.

The phenomenon of fog computing facilities monitoring and management of industrial equipments such as robots, computer numeric controlled (CNC) machines, sensors, actuators, pumps, motorized equipment, and the like. Such industrial equipments, often referred to as operational technology (OT) devices, typically form an integral part of any industrial environment including power plants, oil and gas rigs, high-end data centers, and the like.

The phenomenon of fog computing, when implemented in an industrial environment, promotes a localized distributed resource management paradigm that, in turn, renders various computer-based resources usable in the industrial environment, viz. computational resources, storage resources, network resources, security resources, application resources, and device specific resources, in reasonable proximity to the industrial equipments, which, in turn, entail utilization of such computer-based resources for normal day-to-day functioning. The phenomenon of fog computing ensures that in a typical industrial environment, the industrial equipments and applications, and the computer-based resources utilized by the industrial equipments and applications are essentially located in proximity to one another, with the data processing capabilities necessary, inter-alia, for processing the data generated by the industrial equipments and applications made readily available and seamlessly accessible, given the proximity between the industrial equipments and applications, and the computer-based resources.

The present disclosure envisages a computer-implemented optimization model for optimizing the functionalities of a fog network installed in an industrial environment. Typically, fog nodes are the main constituents of the fog network. In the case of deployment of the fog network in an industrial environment, the constituent fog nodes are communicably coupled to a plurality of industrial equipments executing software-driven industrial applications. Such industrial equipments are also referred to as the endpoints of the fog network. Fog nodes, when configured in accordance with the present disclosure, function as network gateway that provide various industrial equipments with access to requisite computer-based resources usable in the industrial environment, in addition to facilitating monitoring and management of computer-based resources distributed across the fog network.

In accordance with the present disclosure, the fog nodes and the industrial equipments are communicably coupled through an Ethernet based time-sensitive network. In accordance with the present disclosure, the communicable coupling of the fog nodes and the industrial equipments through the Ethernet based time-sensitive network causes the resultant fog network to exhibit time awareness and time sensitivity. In accordance with the present disclosure, the time-sensitive fog network incorporates a centralized controller (i.e., a lead fog node) that generates time-sensitive schedules applicable to each of the fog nodes and the industrial equipments. Further, the centralized controller is also configured to provision the fog nodes and the industrial equipments (the industrial equipments referred to as 'endpoints' hereafter) based on the time-sensitive schedules. In accordance with the present disclosure, while the time-sensitive schedules are typically generated ad managed by the centralized controller, it is also possible that the individual fog nodes and the endpoints generate specific yet mutually collaborative time-sensitive schedules in a hop-by-hop approach based on at least the data flow between the individual fog nodes and endpoints, and the resource-related requirements for such data flows.

Referring to FIG. 1, there is shown a schematic of an exemplary fog network 100 comprising a plurality of fog nodes 102-108 and a plurality of endpoints 112-120. In accordance with the present disclosure, preferably on each of the fog nodes 102-108, a predetermined fog location model is implemented in order to identify at least the number of servers hosted by each fog node 102-108 for processing the data generated by the endpoints 112-120, the location of each of the fog nodes 102-108 (and, in turn, the location of the servers embedded within the respective fog nodes 102-108), the resource requirements (for example, latency requirement) attributed to the endpoints 112-120, the architecture of the fog network 100 and the positioning of each of the fog nodes 102-108 within the fog network 100, and the reachability of each of the fog nodes 102-108 from the other remaining fog nodes.

In accordance with the present disclosure, based at least on the number of servers hosted by each fog node 102-108, the location of each of the fog nodes 102-108 (and, in turn, the location of the servers embedded within the respective fog nodes 102-108), the resource requirements (for example, latency requirement and storage requirement) attributed to the data generated by the endpoints 112-120, the architecture of the fog network 100 and the positioning of each of the fog nodes 102-108 within the fog network 100, and the reachability of each of the fog nodes 102-108 from the remaining fog nodes, the fog location model programmatically designates one of the fog nodes 102-108 as a lead fog node (LFN).

In an exemplary embodiment of the present disclosure, fog node 108 is designated as the lead fog node and therefore, hereafter, reference numeral 108 is used to denote the lead fog node.

In accordance with the present disclosure, the lead fog node 108 is entrusted with the responsibility of configuring the endpoints 112-120 to communicate with one another and with the fog nodes 102-106 over the fog network 100. In accordance with the present disclosure, the endpoints 112-120 are executing applications (software-driven applications) that necessitate deterministic processing capabilities and communication. Accordingly, any information is exchanged between the constituent fog nodes 102-106, the lead fog node 108, and the endpoint 112-120 in a deterministic manner and always within a predictable amount of time. Additionally, computer-based resources are also allocated to each of the endpoints 112-120 in a deterministic and thus predictable manner. By extension, the flow of information between the fog nodes 102-106, the lead fog node 108, and the endpoints 112-120 is considered time-critical communication, with every such flow embodying strict time requirements, being uniquely identifiable, and adhering to the common sense of time achieved by the execution of the Precision Time Protocol (PTP) on the fog nodes 102-106, the lead fog node 108, and the endpoints 112-120. Additionally, the resources allocated to each of the endpoints 112-120 are required to be managed in a time-sensitive manner, such that there are no inconsistencies in the resource allocation that would adversely affect the characteristics and the output of the endpoints 112-120.

In accordance with the present disclosure, the lead fog node 108 configures the endpoints 112-120 to converse with one another over the fog network 100 in a time-sensitive manner through time-sensitive data flows (i.e., flow of information from one endpoint to another in a time-sensitive manner). Preferably, the lead fog node 108 configures every endpoint 112-120 with the information retrieved from a service directory dictating intercommunications between each of the endpoints 112-120. Further, the lead fog node 108 also defines resource constraints for each of the endpoints, which, in turn, trigger the endpoints to cooperate with specific fog nodes at specific time intervals, to consume the resources embodied in the fog nodes, for the purpose of executing predetermined tasks to generate the desired industrial output. Further, the lead fog node 108 also defines at least one communication constraint governing the time-sensitive data flow between the endpoints 112-120.

In accordance with an exemplary embodiment of the present disclosure, the communication constraint defines the maximum permissible latency for communication (i.e., data flow) between two endpoints 116 and 118. For instance, the lead fog node 108 could be pre-programmed to assert that the latency for a data flow between any two endpoints (in this case, endpoints 116 and 118) should not exceed 'ten' milliseconds. And, in an event the latency for a data flow between endpoints 116 and 118 exceeds 'ten' milliseconds, the lead fog node 108 rejects the provisioning of such a data flow. Further, in accordance with the present disclosure, it is also possible that the endpoints 116 and 118 publish to the lead fog node 108, the communication constraint (i.e., the latency) embodying a data flow there between, and request the lead fog node 108 to provision such a data flow with the published communication constraint, with the lead fog node 108 either overriding the published communication constraint and replacing it with a predefined communication constraint, or provisioning data flow based on the published communication constraint. For example, two endpoints 116 and 118 might publish to the lead fog node 108, a latency of 'twenty' milliseconds for a data flow, and the lead fog node 108 may override the communication constraint (latency) of 'twenty' milliseconds and replace it with a predefined latency of 'ten' milliseconds, thereby triggering the endpoints 116 and 116 communicate with one another only with the latency of 'ten' milliseconds instead of the published latency of 'twenty' milliseconds. Also, the phenomenon of communication constraint governing the communication between the endpoints could also be extended to storage requirements, the access permissions assigned to each of the endpoints involved in the communication, the computational resources required to be assigned to each of the endpoints involved in the communication and the like.

In accordance with the exemplary embodiment of the present disclosure, while the latency requirement attributed to the endpoints 116 and 118 is considered as a communication constraint, the quantum of computational resources required for facilitating the data flow between the endpoints 116 and 118, the network resources required for facilitating the data flow, the access permissions assigned to the endpoints 116 and 118, the application-specific resources necessitated by the endpoints 116 and 118, and the device-specific resources required by the endpoints 116 and 118, are considered as the resource constraints. In similarity to the communication constraint (i.e., latency), the resource constraints are also pre-defined. The lead fog 108 decides to either provision the data flow requested between the two endpoints 116 and 118, or rejects the data flow between the said two endpoints 116 and 118, based on any (or all) of the said resource constraints, in addition to the communication constraint.

In accordance with the present disclosure, the provisioning of the data flow between the endpoints 116 and 118 by the lead fog node 108 also involves routing the data flow through at least some of the plurality of fog nodes 102-106, and more specifically through the time-sensitive switches 105A-105C respectively embedded within the fog nodes 102-106. In accordance with the present disclosure, the lead fog node 108 is also configured to identify and allocate the computer-based resources, viz. computational resources, storage resources, network resources, device specific resources, application resources and security resources, for the time-sensitive data flow between the endpoints 116 and 118.

In accordance with the present disclosure, the lead fog node 108 primarily takes into consideration the topology of the fog network 100 and the positioning of the endpoints 116 and 118 within the fog network 100 for provisioning the data flow between the endpoints 116 and 118. Subsequently, the lead fog node 108 identifies the fog nodes (102-106) and, in turn, the time-sensitive switch embedded therein (105A-105C), through which the data flow from the endpoint 116 to the endpoint 118 night have to be routed. Subsequently, the lead fog node 108 generates a time-sensitive network (TSN) path depicting endpoint 116 as the source, endpoint 118 as the destination, and any of the fog nodes 102-106 as the intermediary nodes through which the data may pass en route to the destination endpoint 118.

In accordance with the present disclosure, subsequent to the creation of a TSN path between the endpoints 116 and 118, the lead fog node 108 generates TSN configurations, sets up virtual local area networks (VLANs), programs TSN schedules corresponding to the source endpoint 116, destination endpoint 118, and the intermediary fog nodes (102-106), and enables the source endpoint 116 to communicate with the destination endpoint 118 by transmitting data packets to the destination endpoint 118 via the intermediary fog nodes (102-106). Typically, the lead fog node 108 applies the TSN configurations individually onto the source endpoint 116, destination endpoint 118, the intermediary fog nodes (102-106) and the time-sensitive switches (105A-105C) embedded therein. Preferably, the lead fog node 108 implements network management protocols such as NetCONF, RestCONF to configure the source endpoint 116, destination endpoint 118, the intermediary fog nodes (102-106) and the time-sensitive switches embedded therein (105A-105C). From the perspective of network configuration, the inherent configurations and capabilities of the source endpoint 116, destination endpoint 118, and the intermediary fog nodes (102-106) indicate whether they are to be provisioned by the lead fog node 108. In an event the lead fog node 108 determines the configurations and capabilities of any of the source endpoint 116, destination endpoint 118, the intermediary fog nodes (102-106) and the time-sensitive switches (105A-105C) embedded therein to be in line with the TSN configuration, then the lead fog node 108 abstains from configuring such an endpoint/fog node and instead configures the remaining endpoint/fog nodes whose configurations and capabilities are found to deviate from the prescribed TSN configurations.

In accordance with the present disclosure, the lead fog node 108 also configures, in line with the TSN configurations, the endpoints and fog nodes which are not time-sensitive by default. Preferably, such endpoints and fog nodes which are not time-sensitive would rely on downstream proxy TSN functionality. For example, a fog node or an endpoint which is not characteristically time-sensitive is connected to the ingress of a switch port of a downstream time-sensitive switch. And the proxy TSN functionality may have been embedded within the ingress of the switch port of the downstream time-sensitive switch. In such a case, the lead fog node 108 configures only the downstream device embodying the proxy TSN functionality, in line with the TSN configurations, and not the endpoint or the fog node which is determined to be not time-sensitive, for the ingress of the switch port is affiliated with the downstream time-sensitive switch and therefore inherits, by default, the time-sensitivity entailed by the downstream time-sensitive switch.

In accordance with the present disclosure, as discussed above, the lead fog node 108 primarily takes into consideration the topology of the fog network 100 and the positioning of the endpoints 116 and 118 within the fog network 100 for provisioning the data flow between the endpoints 116 and 118. The lead fog node 108 obtains the topology information of the fog network 100, preferably by querying an endpoint or a fog node located upstream (or northbound) to the lead fog node 108. Alternatively, the lead fog node 108 could be pre-configured with the information corresponding to the topology of the fog network 100. Alternatively, the lead fog node 108 collates the topological information corresponding to the fog network 100 based on the Link Local Discovery Protocol (LL DP) executed on each of the time-sensitive switches 105A-105C embedded respectively within the fog nodes 102-106.

Figure 2:
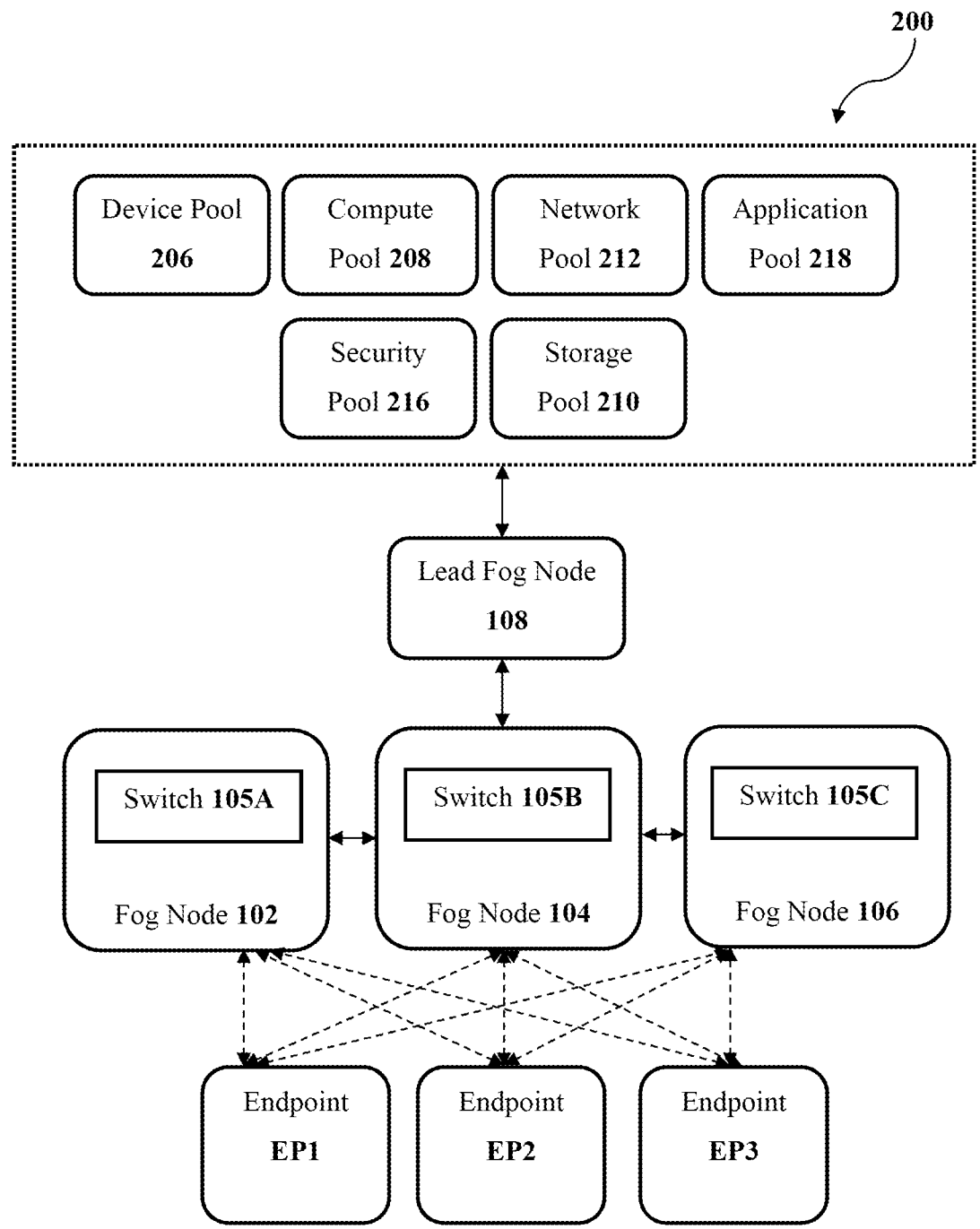
FIG. 2 illustrates yet another exemplary time-sensitive fog network optimized in accordance with the deployment model envisaged by the present disclosure.

Referring to FIG. 2, there is shown yet another exemplary fog network 200 comprising three endpoints EP1, EP2, and EP3. The endpoints EP1, EP2, and EP3 are essentially time-sensitive endpoints. The endpoints EP1, EP2, and EP3 are also communicably coupled to the fog network 200 via Ethernet. In accordance with the present disclosure, the endpoints EP1, EP2, and EP3 are designated, inter-alia, to communicate with one another—during the course of implementing their pre-designated functionalities and executing predetermined tasks—in the form of data flows, and such data flows emanating from the endpoints EP1, EP2, and EP3 are routed through predetermined time-sensitive switches (105A-105C) embedded respectively within the fog nodes 102-106. Further, in accordance with the present disclosure, in order to function effectively in the industrial environment and to accomplish their pre-designated tasks, the endpoints EP1, EP2, and EP3 are configured to cooperate with the fog nodes 102-106 and consume a plurality of computer-based resources assigned to the fog nodes 102-106.

The computer-based resources assigned to the fog nodes 102-106 preferably include computational resources, storage resources, network resources, device-specific resources, application-specific resources and security resources. Each fog node (102-106), in accordance with the present disclosure, transmits to the lead fog node 108, information on the computational resources, network resources, device-specific resources, application-specific resources, security resources, and storage resources assigned thereto. Subsequently, the lead fog node 108 analyzes the resources-related information received from each of the fog nodes 102-106 and virtually segregates the fog nodes 102-106 into a plurality of service-specific clusters referred to as resource pools. For example, the computational resources of the fog nodes 102-106 are virtually segregated into a 'compute pool' 208 (i.e., virtual segregation of the computational resources available across the fog nodes 102-106), whereas the security resources of the fog nodes 102-106 are virtually segregated into a 'security pool' 216 (i.e., virtual segregation of the security resources available across the fog nodes 102-106).

In accordance with the present disclosure, on similar lines, the lead fog node 108 creates a 'storage pool' 210 (i.e., virtual segregation of the storage resources available across the fog nodes 102-106), a 'device pool' 206 (i.e., virtual segregation of specific device-specific resources available across the fog nodes 102-106), an 'application pool' 218 (i.e., virtual segregation of the application-specific resources available across the fog nodes 102-106), and a 'network pool' 212 (i.e., virtual segregation of the network resources satisfying the latency requirements for the endpoints EP1, EP2, and EP3).

In accordance with the present disclosure, the resources-related requirements attributed to the endpoints EP1, EP2, and EP3 are manifested in the form of respective resource constraints. Essentially, the resource constraints of time-sensitive endpoints EP1, EP2, and EP3 respectively describe the quantum of the computational resources, network resources, security resources, application-specific resources, device-specific resources and storage resources required at any given fog node (102-106) for facilitating the implementation of the functionalities of the time-sensitive endpoints EP1, EP2, and EP3, and also for processing the data generated by the time-sensitive endpoints EP1, EP2, and EP3. Further, the lead fog node 108 manifests the resource constraints of each of the endpoints EP1, EP2, and EP3 as corresponding resource profiles.

For example, the computational resources required by endpoint EP1 are manifested in a compute profile, whereas the storage resources required by endpoint EP1 are manifested in a storage profile. Likewise, the device-specific resources required by the endpoint EP1 are manifested in a device profile and the application-specific requirements of the endpoint EP1 are manifested in an application profile. Similarly, the access permissions required for the endpoint EP1 to perform its pre-designated tasks and communicate with the remaining endpoints EP2 and EP3 are manifested in a security profile, while the latency requirements attributed to the endpoint EP1 are manifested in a network profile. In accordance with the present disclosure, the compute profile for EP1, the storage profile for EP1, the device profile for EP1, the application profile for EP1, the network profile for EP1, and the security profile for EP1 are integrated to form the resource profile for EP1. In accordance with the present disclosure, the resources-related requirements attributed to the endpoints EP2 and EP3 are also manifested in the form of respective compute profiles, storage profiles, device profiles, application profiles, and network profiles, with the said profiles integrated to form the resources profiles for EP2 and EP3 respectively.

In accordance with the present disclosure, the lead fog node 108, in order to provision the time-sensitive endpoints EP1, EP2, and EP3 to consume in a time-sensitive and deterministic manner the computer-based resources attributed to the fog nodes 102-106, programmatically compares each of the resource pools, i.e., the computational resources of the compute pool 208, network resources of the network pool 212, security resources of the security pool 216, storage resources of the storage pool 210, application-specific resources of the application pool 218, and device-specific resources of the device pool 206, with the resource profiles (i.e., the compute profile, the network profile, the security profile, the application profile, the device profile, and the storage profile) of EP1, EP2, and EP3 respectively and identifies fog nodes (102-106) that optimally satisfy the resource profiles of each of the endpoints EP1, EP2, and EP3.

For example, the lead fog node 108 compares the quantum of computational resources required by endpoint EP1 (i.e., the compute profile attributed to EP1), with the computational resources virtually embodied in the compute pool 208 and identifies from the compute pool 208, the fog node (for example, fog node 102) embodying the computational resources that best fit the compute profile of the endpoint EP1. And subsequently, the lead fog node 108 triggers the endpoint EP1 to cooperate with the fog node (i.e., fog node 102) identified as embodying the computational resources best fitting the compute profile of endpoint EP1.

Likewise, the lead fog node 108 compares the quantum of network resources required by endpoint EP1 to satisfy the latency requirements (i.e., the network profile attributed to EP1), with the network resources virtually embodied in the network pool 212, and identifies from the network pool 212, the fog node (for example, fog node 102) embodying the network resources that best fit the latency requirements attributed to endpoint EP1. And subsequently, the lead fog node 108 triggers the endpoint EP1 to cooperate with the fog node (i.e., fog node 102) identified as embodying the network resources best fitting the network profile of endpoint EP1 and thus enabling the endpoint EP1 to satisfy the latency requirements.

Likewise, the lead fog node 108 compares the quantum of storage resources required by endpoint EP1 (i.e., storage profile attributed to EP1), with the storage resources virtually embodied in the storage pool 210, and identifies from the storage pool 210, the fog node (for example, fog node 104) embodying the storage resources that best fit the storage profile of the endpoint EP1. And subsequently, the lead fog node 108 triggers the endpoint EP1 to cooperate with the fog node (i.e., fog node 104) identified as embodying the storage resources best fitting the storage profile of endpoint EP1.

Likewise, the lead fog node 108 compares the quantum of device-specific resources required by endpoint EP1 (i.e., device profile attributed to EP1), with the device-specific resources virtually embodied in the device pool 206, and identifies from the device pool 206, the fog node (for example, fog node 104) embodying the device-specific resources that best fit the device profile of the endpoint EP1. And subsequently, the lead fog node 108 triggers the endpoint EP1 to cooperate with the fog node (i.e., fog node 104) identified as embodying the device specific resources best fitting the device profile of endpoint EP1.

Likewise, the lead fog node 108 compares the quantum of application-specific resources required by endpoint EP1 (i.e., the application profile attributed to EP1), with the application-specific resources virtually embodied in the application pool 218, and identifies from the application pool 218, the fog node (for example, fog node 106) embodying the application-specific resources that best fit the application-specific requirements attributed to the endpoint EP1. And subsequently, the lead fog node 108 triggers the endpoint EP1 to cooperate with the fog node (i.e., fog node 106) identified as embodying the application-specific resources best fitting the application profile of endpoint EP1.

Likewise, the lead fog node 108 compares the quantum of security resources required by endpoint EP1 to communicate with the endpoints EP2 and EP3 (i.e., the security profile attributed to EP1), with the security resources virtually embodied in the security pool 216, and identifies from the security pool 216, the fog node (for example, fog node 106) embodying the security resources (for example, the access permissions) that best fit the security profile of EP1 and enable the endpoint EP1 to communicate with EP2 and EP3. And subsequently, the lead fog node 108 triggers the endpoint EP1 to cooperate with the fog node (i.e., fog node 106) identified as embodying the security resources required by endpoint EP1 to communicate with endpoints EP2 and EP3. Further, the lead fog node 108 repeats the aforementioned procedure for the remaining endpoints EP2 and EP3, and determines the fog nodes (102-106) that embody the resources for fulfilling the resource profiles of endpoints EP2 and EP3.

In accordance with the present disclosure, the lead fog node 108 triggers the endpoint EP1 to cooperate with fog node 102 for accessing the computational resources and network resources (from the compute pool 208 and network pool 212 respectively), cooperate with fog node 104 for accessing the storage resources and device-specific resources (from the storage pool 210 and device pool 206 respectively), and cooperate with the fog node 106 for accessing the application-specific resources and security resources (from the application pool 218 and security pool 216 respectively).

In accordance with the present disclosure, the lead fog node 108, by implementing the above-mentioned features, executes the deployment model for provisioning the resources embodied in different fog nodes (102-106) to the endpoints in a time-sensitive and deterministic manner, based on the resource profile of the endpoints (116-120; EP1, EP2, and EP3), and further based on the suitability of the resources embodied in the fog nodes (102-106) to the resource profile of the endpoints (116-120; EP1, EP2, and EP3). As described in the aforementioned example, all the resource profiles (i.e., the resource constraints) of an endpoint (i.e., endpoint EP1) may not be satisfied by a single fog node. The endpoint EP1, in this case, is configured by the lead fog node 108 to cooperate with fog node 102, fog node 104, and fog node 106 to access the necessary computer-based resources. Further, in an exemplary scenario, it is also possible that the 'six' different resource profiles of an endpoint (i.e., compute profile, device profile, application profile, network profile, storage profile, and security profile) are satisfied respectively by the resources embodied in 'six' different fog nodes. In such a case, the lead fog node 108 automatically provisions the endpoint EP1 to cooperate with each of the 'six' fog nodes in a time-sensitive and deterministic manner.

In accordance with the present disclosure, the lead fog node 108 is further configured to categorize certain resource profiles and, in turn, the underlying resource constraints as static, and the remaining resource profiles and, in turn, the underlying resource constraints as dynamic. Subsequently, the lead fog node 108 is configured to either prioritize the static resource profiles over the dynamic resource profiles, or prioritize dynamic resource profiles over static resource profiles. In an event the static resource profiles are prioritized over the dynamic resource profiles, the lead fog node 108 compares only the resource requirements specified in the static resource profiles, with the resources segregated in the corresponding resource pools. For example, if the storage profile of endpoint EP1 is deemed static and the remaining resource profiles are deemed dynamic, and if static resource profiles are prioritized over dynamic resource profiles, then the lead fog node 108 primarily compares only the storage-specific requirements of the endpoint EP1—all the while ignoring the rest of the resource profiles deemed dynamic—against the storage resources virtually embodied in the storage pool 210, and identifies from the storage pool 210, the fog node (for example, fog node 104) embodying the optimal storage resources that are the best fit to the storage requirements attributed to the endpoint EP1. And subsequently, the lead fog node 108 triggers the endpoint EP1 to cooperate only with the fog node 104 for storage resources related requirements, since only fog node 104 is identified as embodying the storage resources best fitting the static storage profile of the endpoint EP1, and since the storage profile of EP1 is prioritized over the remaining dynamic resource profiles (i.e., compute profile, device profile, application profile, security profile, and network profile) of endpoint EP1. And as far as the dynamic resource profiles are concerned, the lead fog node 108 responds to the modifications to the dynamic resource profiles and identifies resource pools, and in turn, the resources that satisfy the modified resource profiles, all the while considering the storage profile and the corresponding storage resource related requirements as static. In such a scenario, while the endpoint EP1 may cooperate with either fog node 102 or fog node 106 for the fulfillment of dynamic resource profiles, it (endpoint EP1) is authorized by the lead fog node 108 to cooperate only with fog node 104 for the fulfillment of storage resources related requirements.

However, if the compute profile of endpoint EP1 is deemed dynamic and the remaining resource profiles (i.e., storage profile, device profile, application profile, security profile, and network profile) are deemed static, and if dynamic resource profiles are prioritized over static resource profiles, then the lead fog node 108 primarily compares only the computational requirements of the endpoint EP1—all the while ignoring the rest of the resource profiles deemed static—against the computational resources virtually embodied in the compute pool 208, and identifies from the compute pool 208, the fog node (for example, fog node 102) embodying the computational resources that are the best fit to the computational requirements attributed to the endpoint EP1 at the time of comparison. And subsequently, the lead fog node 108 triggers the endpoint EP1 to cooperate only with the fog node 102 for computational resources related requirements, since at the moment of comparison only fog node 102 is identified as embodying the computational resources best fitting the dynamic compute profile of the endpoint EP1, and since the dynamic compute profile of EP1 is prioritized over the remaining static resource profiles (i.e., storage profile, device profile, application profile, security profile, and network profile) of endpoint EP1. And as far as the static resource profiles are concerned, the lead fog node 108 triggers the endpoint EP1 to cooperate only with specific fog nodes. That is, for example, to fulfill a static storage profile, the endpoint EP1 is authorized by the lead fog node 108 to cooperate only with fog node 104, whereas to fulfill a static network profile, the endpoint EP1 is authorized by the lead fog node 108 to cooperate only with fog node 106. And in this case, as and when the dynamic compute profile of the endpoint EP1 is modified, the lead fog node identifies from the compute pool 208, the fog node embodying the computational resources that are the best fit to the modified computational requirements attributed to the endpoint EP1. The modified computational requirements could be stratified either by fog node 104 or fog node 106 instead of fog node 102 which fulfilled the previous iteration (version) of the compute profile of EP1. In such a case, the lead fog node 108 instructs the endpoint EP1 to stop cooperating with fog node 102 and to initiate cooperation with either fog node 104 or 106.

In accordance with the present disclosure, the lead fog node 108 responds to any modifications to the resource profiles of endpoints EP1, EP2, and EP3, and accordingly compares the modified resource profiles to the resource pools, and re-identifies the fog nodes (102-106) and the resources embodied therein that satisfy the modified resource profiles. Further, in response to iterative modifications of the resource profiles of endpoints EP1, EP2, and EP3, the lead fog node 108 iteratively compares the corresponding (iteratively) modified resource profiles to the resource pools, and identifies the fog nodes (102-106) and the resources embodied therein that satisfy each iteration of the modified resource profiles.

Figure 3A:
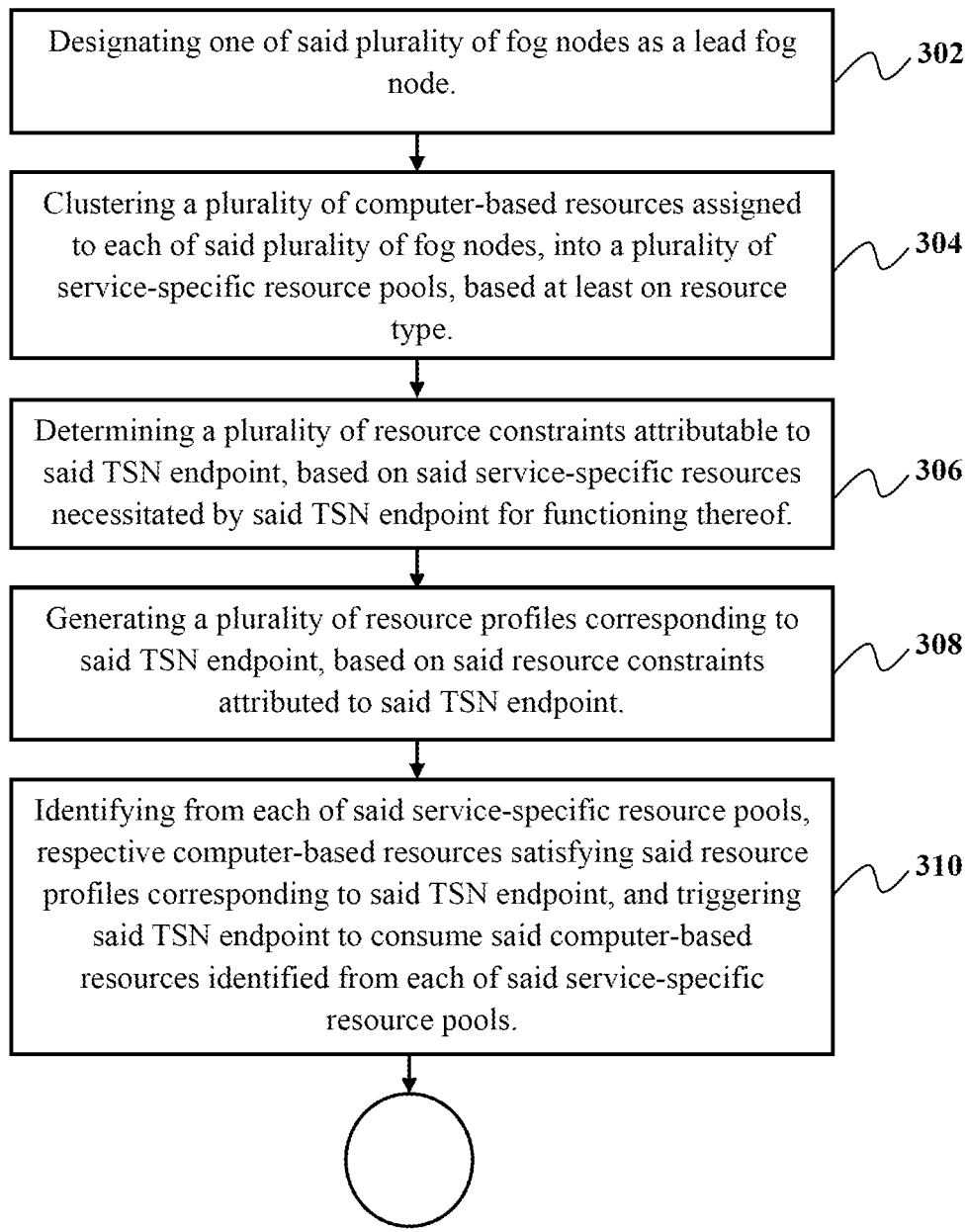
FIG. 3A and FIG. 3B in combination illustrate a flowchart describing the steps involved in the computer-implemented method for optimizing a time sensitive fog network, in accordance with the present disclosure.
Figure 3B:
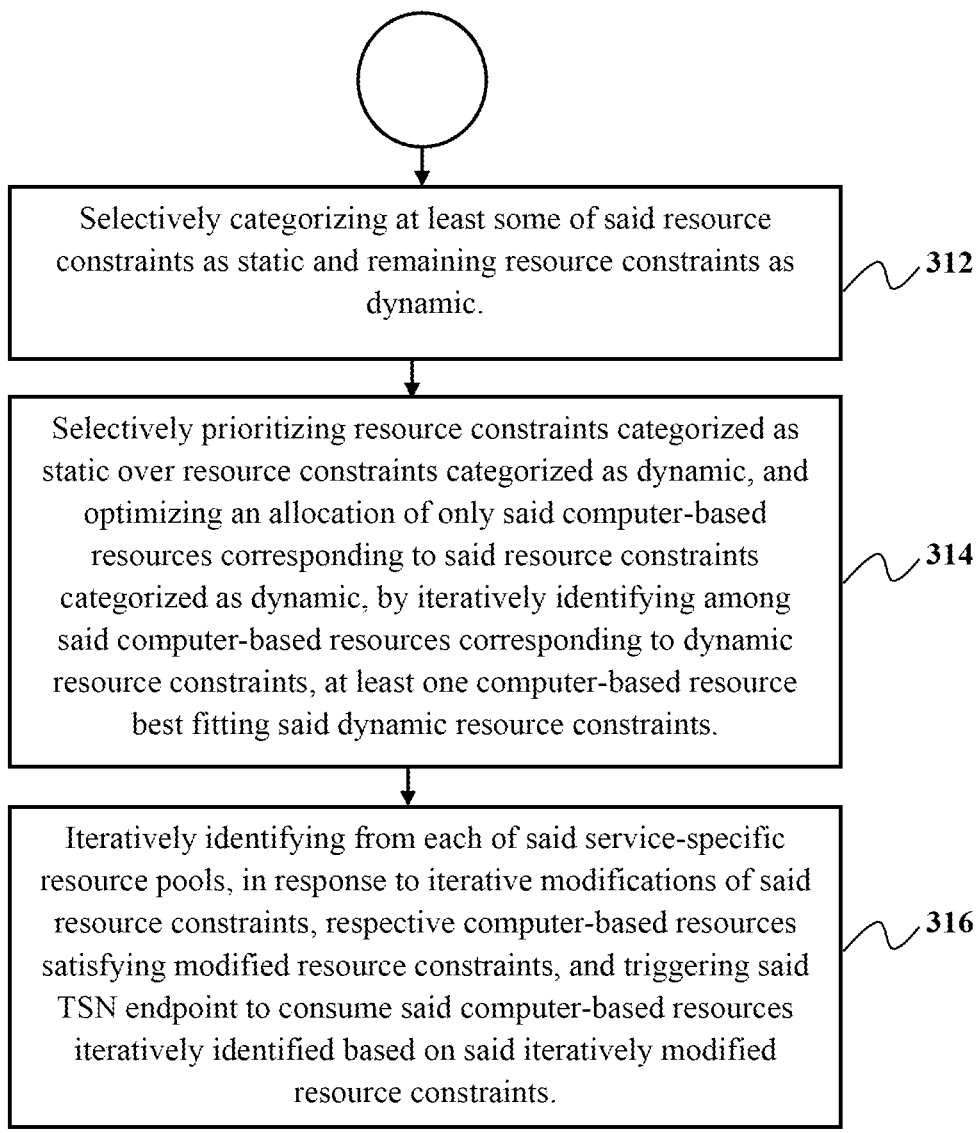

Referring to FIG. 3A and FIG. 3B in combination, there is shown a flowchart illustrating the steps involved in the computer-implemented method for optimizing the time-sensitive fog network, in accordance with the present disclosure. The execution of the method begins at step 302 when one of the plurality of fog nodes is designated as the lead fog node (LFN). As described in the earlier paragraphs, the time-sensitive fog network comprises a plurality of fog nodes and a plurality of endpoints (EP1, EP2, and EP3). Preferably, step 302 entails executing a predetermined fog location model on each of the fog nodes and identifying at least the number of servers hosted by each fog node for processing the data generated by the endpoints, the location of each of the fog nodes (and, in turn, the location of the servers embedded within the respective fog nodes), the resource requirements (for example, latency requirement) attributed to the endpoints, the architecture of the time-sensitive fog network and the positioning of each of the fog nodes within the time-sensitive fog network, and the reachability of each of the fog nodes from the other remaining fog nodes.

In accordance with the present disclosure, at step 302, based at least on the number of servers hosted by each fog node for processing the data generated by the endpoints, the location of each of the fog nodes (and, in turn, the location of the servers embedded within the respective fog nodes), the resource requirements (for example, latency requirement) attributed to the endpoints, the architecture of the time-sensitive fog network and the positioning of each of the fog nodes within the time-sensitive fog network, and the reachability of each of the fog nodes from the other remaining fog nodes, the fog location model programmatically designates one of the fog nodes as the lead fog node (LFN).

Subsequently, at step 304, the lead fog node clusters a plurality of computer-based resources embodied within each of the fog nodes into a plurality of service-specific resource pools, based at least on the type of the resource. In accordance with the present disclosure, the computer-based resources assigned to the fog nodes 102-106 include computational resources, storage resources, network resources, device specific resources, application resources and security resources. Each fog node transmits to the lead fog node the information on the computational resources, network resources, security resources, and storage resources assigned thereto. Subsequently, the lead fog node analyzes the resources-related information received from each of the fog nodes and virtually segregates the fog nodes 102-106 and the corresponding resources into a plurality of service-specific clusters referred to as resource pools. Essentially, the computational resources of the fog nodes are virtually segregated into the 'compute pool' (i.e., virtual segregation of the computational resources available across the fog nodes), whereas the security resources of the fog nodes are virtually segregated into the 'security pool' (i.e., virtual segregation of the security resources available across the fog nodes). In accordance with the present disclosure, on similar lines, the lead fog node creates the 'storage pool' (i.e., virtual segregation of the storage resources available across the fog nodes), the 'device pool' (i.e., virtual segregation of specific device specific resources available across the fog nodes), the 'application pool' (i.e., virtual segregation of specific application types available across the fog nodes), and the 'network pool' (i.e., virtual segregation of the network resources satisfying the latency requirements for the endpoints EP1, EP2, and EP3).

Subsequently, at step 306, the lead fog node determines a plurality of resource constraints attributable to the endpoints EP1, EP2, and EP3. In accordance with the present disclosure, the resource constraints describe the service-specific resources necessitated by the endpoints EP1, EP2, and EP3 to perform predetermined tasks in the industrial environment. Essentially, the resource constraints of time-sensitive endpoints EP1, EP2, and EP3 respectively describe the quantum of the computational resources, network resources, security resources, application specific resources, device specific resources and storage resources required at any given fog node for the implementation of the functionalities of the time-sensitive endpoints EP1, EP2, and EP3, and also for processing the data generated by the time-sensitive endpoints EP1, EP2, and EP3. Accordingly, the lead fog node manifests the resource constraints of each of the endpoints EP1, EP2, and EP3 as corresponding resource profiles. For example, the computational resources required by endpoint EP1 are manifested in the compute profile, whereas the storage resources required by endpoint EP1 are manifested in the storage profile. Likewise, the device specific resources required by the endpoint EP1 are manifested in the device profile and the application specific requirements of the endpoint EP1 are manifested in the application profile. Similarly, the access permissions required for the endpoint EP1 to perform its pre-designated tasks and communicate with the remaining endpoints EP2 and EP3 are manifested in the security profile, while the latency requirements attributed to the endpoint EP1 are manifested in the network profile.

In accordance with the present disclosure, at step 308, the compute profile for EP1, the storage profile for EP1, the device profile for EP1, the application profile for EP1, the network profile for EP1, and the security profile for EP1 are integrated to form the resource profile for EP1. In accordance with the present disclosure, the resources-related requirements attributed to the endpoints EP2 and EP3 are also manifested in the form of respective compute profiles, storage profiles, device profiles, application profiles, and network profiles, with the said profiles integrated to form the resources profiles for EP2 and EP3.

Further, at step 310, the lead fog node, in order to provision the time-sensitive endpoints EP1, EP2, and EP3 to consume in a time-sensitive and deterministic manner the computer-based resources attributed to the fog nodes, programmatically compares each of the resource pools, i.e., the computational resources of the compute pool, network resources of the network pool, security resources of the security pool, storage resources of the storage pool, application-specific resources of the application pool, and device-specific resources of the device pool, with the resource profiles (i.e., the compute profile, the network profile, the security profile, the application profile, the device profile, and the storage profile) of EP1, EP2, and EP3, and identifies fog nodes that optimally satisfy the resource profiles of each of the endpoints EP1, EP2, and EP3.

Further, at step 312, the lead fog node categorizes certain resource profiles and, in turn, the underlying resource constraints as static, and the remaining resource profiles and, in turn, the underlying resource constraints as dynamic. Subsequently, the lead fog node is configured to either prioritize the static resource profiles over the dynamic resource profiles, or prioritize dynamic resource profiles over static resource profiles.

In an event the static resource profiles are prioritized over the dynamic resource profiles (step 314), the lead fog node compares only the resource requirements specified in the static resource profiles, with the resources segregated in the corresponding resource pools. For example, if the storage profile of endpoint EP1 is deemed static and the remaining resource profiles are deemed dynamic, and if static resource profiles are prioritized over dynamic resource profiles, then the lead fog node primarily compares only the storage-specific requirements of the endpoint EP1—all the while ignoring the rest of the resource profiles deemed dynamic—against the storage resources virtually embodied in the storage pool, and identifies from the storage pool, the fog node (for example, fog node 104) embodying the optimal storage resources that are the best fit to the storage requirements attributed to the endpoint EP1. And subsequently, the lead fog node triggers the endpoint EP1 to cooperate only with the fog node 104 for storage resources related requirements, since only fog node 104 is identified as embodying the storage resources best fitting the static storage profile of the endpoint EP1, and since the storage profile of EP1 is prioritized over the remaining dynamic resource profiles (i.e., compute profile, device profile, application profile, security profile, and network profile) of endpoint EP1. And as far as the dynamic resource profiles are concerned, the lead fog node responds to the modifications to the dynamic resource profiles and identifies resource pools, and in turn, the resources that satisfy the modified resource profiles, all the while considering the storage profile and the corresponding storage resource related requirements as static. In such a scenario, while the endpoint EP1 may cooperate with either fog node 102 or fog node 106 for the fulfillment of dynamic resource profiles, it (endpoint EP1) is authorized by the lead fog node 108 to cooperate only with fog node 104 for the fulfillment of storage resources related requirements.

However, if the compute profile of endpoint EP1 is deemed dynamic and the remaining resource profiles (i.e., storage profile, device profile, application profile, security profile, and network profile) are deemed static, and if dynamic resource profiles are prioritized over static resource profiles (step 314), then the lead fog node primarily compares only the computational requirements of the endpoint EP1—all the while ignoring the rest of the resource profiles deemed static—against the computational resources virtually embodied in the compute pool 208, and identifies from the compute pool, the fog node (for example, fog node 102) embodying the computational resources that are the best fit to the computational requirements attributed to the endpoint EP1 at the time of comparison. And subsequently, the lead fog node triggers the endpoint EP1 to cooperate only with the fog node 102 for computational resources related requirements, since at the moment of comparison only fog node 102 is identified as embodying the computational resources best fitting the dynamic compute profile of the endpoint EP1, and since the dynamic compute profile of EP1 is prioritized over the remaining static resource profiles (i.e., storage profile, device profile, application profile, security profile, and network profile) of endpoint EP1. And as far as the static resource profiles are concerned, the lead fog node triggers the endpoint EP1 to cooperate only with specific fog nodes. That is, for example, to fulfill a static storage profile, the endpoint EP1 is authorized by the lead fog node to cooperate only with fog node 104, whereas to fulfill a static network profile, the endpoint EP1 is authorized by the lead fog node to cooperate only with fog node 106. And in this case, as and when the dynamic compute profile of the endpoint EP1 is modified, the lead fog node identifies from the compute pool, the fog node embodying the computational resources that are the best fit to the modified computational requirements attributed to the endpoint EP1. The modified computational requirements could be stratified either by fog node 104 or fog node 106 instead of fog node 102 which fulfilled the previous iteration (version) of the compute profile of EP1. In such a case, the lead fog node 108 instructs the endpoint EP1 to stop cooperating with fog node 102 and to initiate cooperation with either fog node 104 or 106.

Further, at step 316, the lead fog node responds to any modifications to the resource profiles of endpoints EP1, EP2, and EP3, and accordingly compares the modified resource profiles to the resource pools, and re-identifies the fog nodes and the resources embodied therein that satisfy the modified resource profiles. Further, in response to iterative modifications of the resource profiles of endpoints EP1, EP2, and EP3, the lead fog node iteratively compares the corresponding (iteratively) modified resource profiles to the resource pools, and identifies the fog nodes and the resources embodied therein that satisfy each iteration of the modified resource profiles.

And in this manner, the lead fog node 108, by implementing the above-mentioned features, executes the deployment model for provisioning the resources embodied in different fog nodes (102-106) to the endpoints in a time-sensitive and deterministic manner, based on the resource profile of the endpoints (116-120; EP1, EP2, and EP3), and further based on the suitability of the resources embodied in the fog nodes (102-106) to the resource profile of the endpoints (116-120; EP1, EP2, and EP3).

TECHNICAL ADVANTAGES

The technical advantages envisaged by the present disclosure include the realization of a computer-implemented deployment model that abridges the geo-distance between the industrial applications in an industrial environment and the computer-based resources, i.e., the computational resources, storage resources, network resources, and security resources, utilized by the industrial applications to execute various predetermined tasks. The present disclosure envisages a localized yet distributed resource management paradigm, wherein the computer-based resources are placed on the edge of the network interconnecting the industrial equipments, such that the resources, and consequentially the computing, networking, security, and storage capabilities are readily available close to the end users, i.e., the industrial equipments and the industrial applications executed thereon, in this case.

The computer-implemented deployment model envisaged by the present disclosure caters to industrial applications and equipments that embody diversified latency requirements and are sensitive to latency. Further, the computer-implemented deployment model also takes into account the dynamicity of the fog nodes constituting a fog network tasked with managing the allocation of the computer-based resources to the industrial applications and equipments, and the dynamicity of the resource-related requirements attributed to the industrial applications and equipments. Further, the computer-implemented deployment model also emphasizes on providing fine-grained Quality of Service to the industrial applications and equipments (identified as endpoints in a fog network), by attributing deterministic upper bounds of latency, high priority (HP) treatment, and guaranteed maximum bandwidth to the intercommunication between the endpoints.

The computer-implemented deployment model envisages classifying the industrial applications and equipments into resource profiles and classifying the computer-based resources that the industrial applications and equipments request access to into resource pools. Subsequently, the resource pools are provisioned for each of the resource profiles by a centralized control element, preferably, a lead fog node situated within the fog network. A centrally located lead fog node, which forms the core of the computer-implemented deployment model, undertakes the responsibility of provisioning the resource pools for resource profiles in an end user transparent manner, wherein the lead fog node programmatically identifies from the resource pool various resources that satisfy each of the resource profiles. The lead fog node, in accordance with the present disclosure, is also configured to be sensitive to the changes in the resource profiles, such that any changes to the resource profiles triggers an immediate recalibration (reassignment) of the resource pools assigned to such resource profiles. Likewise, the lead fog node is configured to be responsive to any changes brought upon the resource pool in the sense that any changes to the resource pool also triggers the immediate recalibration of the resource pools assigned to such resource profiles. Further, in the case of iterative modifications to either the resource pool, or the resource profiles, or both, the lead fog node triggers recalibrations suitable for every iteration of the modification to the resource pool, or the resource profiles, or both.

The lead fog node, in response to the occurrence of high availability (HA) events at an endpoint, for example, failure of a resource attached to the endpoint—failure of a hard disk drive (HDD) leading to the storage profile of the endpoint being compromised—and the consequential inability of the endpoint to honor the resource profile, automatically triggers a migration of the applications executing on the failed endpoint to another appropriate endpoint embodying appropriate resource pools, thereby ensuring minimal disruption of services within the fog network.

Further, the computer-implemented deployment model, by taking into account the dynamicity of the fog nodes constituting the fog network and the resource-related requirements attributed to the industrial applications and equipments at different points in time, envisages a significant technical advantage vis-à-vis traditional fog networks which necessitate the location of the fog nodes within the fog network to be static, the intercommunication paths between the endpoints to remain unchanged for prolonged periods of time, the resources profiles assigned to the endpoint to remain static for prolonged periods of time, and resource pools provisioned for the resource profiles to remain unchanged for prolonged periods of time. Further, the computer-implemented deployment model allows endpoints to remain in an 'always-off' state, and selectively turns-on the endpoints based on the provisioning of the resource pools to the resource profiles corresponding to the endpoints, thereby optimizing resource allocation and usage across the fog network. Further, the computer-implemented deployment model envisaged by the present disclosure is configured to automatically and repetitively iterate through multitude of resource pools and resource profiles, before provisioning the resource pools in view of the requirements specified in the resource profiles. Further, the computer-implemented deployment model envisaged by the present disclosure allows certain resource profiles to exhibit dynamicity in terms of resource requirements and the remaining resource profiles to inhibit static resource requirements during the provisioning the resource pools in view of the requirements specified in the resource profiles. Further, the computer-implemented deployment model is also configured to honor the dynamic nature of certain resource profiles and the contrasting static mature of the remaining resource profiles across multiple iterations of the provisioning of the resource pools to the resource profiles. Further, the computer-implemented deployment model is also configured to react on an immediate basis to any modifications in either the resource profile or the resource pool, and accordingly recalibrate the provisioning of the resource pools to the resource profiles, after automatically analyzing the suitability of the various resource pools to the resource profiles or vice-versa in view of the said modifications.

What is claimed is:

1. A computer-implemented system for optimizing a time-sensitive fog network, said time-sensitive fog network comprising a plurality of fog nodes, at least one TSN endpoint, and wherein said time-sensitive fog network is further configured to designate one of said plurality of fog nodes as a lead fog node, said lead fog node comprising:

at least one processor;

at least one memory module storing computer program code, and communicably coupled to said processor, wherein said memory module and the computer program code stored therein are configured, along with said processor, to cause said lead fog node to:

cluster a plurality of computer-based resources assigned to each of said plurality of fog nodes, into a plurality of service-specific resource pools, based at least on resource type;

determine a plurality of resource constraints attributable to said at least one TSN endpoint, based on said service-specific resources necessitated by said TSN endpoint for functioning thereof;

generate a plurality of resource profiles corresponding to said at least one TSN endpoint, based on said resource constraints attributed to said at least one TSN endpoint, and wherein said resource constraints describe at least said service-specific resources necessitated by said at least one TSN endpoint for functioning thereof;

identify from each of said service-specific resource pools, respective computer-based resources satisfying said resource profiles corresponding to said at least one TSN endpoint, and trigger said at least one TSN endpoint to consume said computer-based resources identified from each of said service-specific resource pools;

and wherein said lead fog node is configured to selectively categorize at least some of said resource profiles as static and remaining resource profiles as dynamic, said lead fog node further configured to:

selectively prioritize dynamic resource profiles over static resource profiles, or said static profiles over said dynamic profiles;

optimize an allocation of only said computer-based resources corresponding to said dynamic resource profiles, by identifying among said service-specific resource pools, at least one computer-based resource best fitting said dynamic resource profiles, in an event said dynamic resource profiles are prioritized over said static resource profiles;

and optimize an allocation of only said computer-based resources corresponding to said static resource profiles, by identifying among said service-specific resource pools, at least one computer-based resource best fitting said static resource profiles, in an event said static resource profiles are prioritized over said dynamic resource profiles;

and wherein said lead fog node is further configured to be responsive to iterative modifications to said resource profiles attributed to said at least one TSN endpoint, said lead fog node further configured to identify, from each of said service-specific resource pools, respective computer-based resources satisfying modified resource profiles, and trigger said at least one TSN endpoint to consume said computer-based resources identified based on said iteratively modified resource profiles;

wherein said processor is configured to selectively allow said at least one TSN endpoint to communicate with a peer TSN endpoint over said time-sensitive fog network, only in an event a proposed communication between said at least one TSN endpoint and said peer TSN endpoint fulfills at least one predefined communication constraint, and wherein said communication between said at least one TSN endpoint and said peer TSN endpoint is routed, by said processor, through at least some of a plurality of TSN switches embedded within corresponding fog nodes, and wherein said plurality of TSN switches are selected based at least on said communication constraint;

wherein said processor is configured to maintain said at least one TSN endpoint and said peer TSN endpoint in an OFF state, said processor further configured to selectively transform said at least one TSN endpoint and said peer TSN endpoint into an ON state, only in an event said communication between said at least one TSN endpoint and said peer TSN endpoint satisfies said communication constraint.

2. The time-sensitive fog network as claimed in claim 1, wherein said resource profiles corresponding to said at least one TSN endpoint include at least a device profile, a compute profile, a storage profile, a network profile, a security profile, and an application profile.

3. The time-sensitive fog network as claimed in claim 1, wherein said resource constraints include a device-specific constraint, a computational resource-related constraint, a network utilization-related constraint, a security-related constraint, a storage-related constraint, and an application related constraint.

4. The time-sensitive fog network as claimed in claim 1, wherein said plurality of service-specific resource pools include a device pool, a compute pool, a storage pool, a network pool, a security pool, and an application pool.

5. The time-sensitive fog network as claimed in claim 1, wherein said processor iteratively searches said plurality of service-specific resource pools, to identify said computer-based resources satisfying said resource profiles and said resource constraints corresponding to said resource profiles.

6. A computer-implemented method for optimizing a time-sensitive fog network incorporating a plurality of fog nodes and at least one TSN endpoint, said method comprising the following computer-implemented steps:
designating one of said plurality of fog nodes as a lead fog node;
clustering, by a processor embedded within said lead fog node, a plurality of computer-based resources assigned to each of said plurality of fog nodes, into a plurality of service-specific resource pools, based at least on resource type;
determining, by said processor, a plurality of resource constraints attributable to said at least one TSN endpoint, based on said service-specific resources necessitated by said at least one TSN endpoint for functioning thereof;
generating, by said processor, a plurality of resource profiles corresponding to said at least one TSN endpoint, based on said resource constraints attributed to said at least one TSN endpoint, and wherein said resource constraints describe at least said service-specific resources necessitated by said at least one TSN endpoint for functioning thereof;
identifying, by said processor, from each of said service-specific resource pools, respective computer-based resources satisfying said resource profiles corresponding to said at least one TSN endpoint, and triggering said at least one TSN endpoint to consume said computer-based resources identified from each of said service-specific resource pools;
selectively categorizing, by said processor, at least some of said resource profiles as static and remaining resource profiles as dynamic;
selectively prioritizing, by said processor, dynamic resource profiles over static resource profiles, or said static profiles over said dynamic profiles;
optimizing, by said processor, an allocation of only said computer-based resources corresponding to said dynamic resource profiles, by identifying among said service-specific resource pools, at least one computer-based resource best fitting said dynamic resource profiles, in an event said dynamic resource profiles are prioritized over said static resource profiles;
optimizing, by said processor, an allocation of only said computer-based resources corresponding to said static resource profiles, by identifying among said service-specific resource pools, at least one computer-based resource best fitting said static resource profiles, in an event said static resource profiles are prioritized over said dynamic resource profiles;
and identifying, by said processor, from each of said service-specific resource pools, in response to iterative modifications of said resource profiles, respective computer-based resources satisfying modified resource profiles, and triggering, by said processor, said at least one TSN endpoint to consume said computer-based resources identified based on said iteratively modified resource profiles;
wherein the method further includes the steps of selectively facilitating, by said processor, communication between said at least one TSN endpoint and a peer TSN endpoint over said time-sensitive fog network, based at least on fulfillment of at least one predefined communication constraint by said at least one TSN endpoint and said peer TSN endpoint, and routing, by said processor, said communication between said at least one TSN endpoint and said peer TSN endpoint through at least some of a plurality of TSN switches embedded within corresponding fog nodes, and wherein said at least some TSN switches are selected by said processor based at least on a communication constraint;
wherein the method further includes the step of maintaining, by said processor, said at least one TSN endpoint and said peer TSN endpoint in an OFF state, and transforming, by said processor, said at least one TSN endpoint and said peer TSN endpoint into an ON state, only in an event said communication between said TSN endpoint and said peer TSN endpoint is determined to satisfy said communication constraint.

7. The method as claimed in claim 6, wherein the method further includes the step of iteratively searching, by said processor, said plurality of service-specific resource pools, for identifying from said service-specific resource pools, said computer-based resources satisfying said resource profiles and said resource constraints corresponding to said resource profiles.

8. A non-transitory computer-readable storage medium storing computer-executable instructions thereon, said computer-executable instructions, when executed by a computer processor, cause said processor to:
optimize a time-sensitive fog network incorporating a plurality of fog nodes and at least one TSN endpoint, and wherein said computer-executable instructions further cause said processor to:
designate one of said plurality of fog nodes as a lead fog node; cluster a plurality of computer-based resources assigned to each of said plurality of fog nodes, into a plurality of service-specific resource pools, based at least on resource type; determine a plurality of resource constraints attributable to said at least one TSN endpoint, based on said service-specific resources necessitated by said at least one TSN endpoint for functioning thereof; generate a plurality of resource profiles corresponding to said at least one TSN endpoint, based on said resource constraints attributed to said at least one TSN endpoint, and wherein said resource constraints describe at least said service-specific resources necessitated by said TSN endpoint for functioning thereof; identify from each of said service-specific resource pools, respective computer-based resources satisfying said resource profiles corresponding to said at least one TSN endpoint, and trigger said at least one TSN endpoint to consume said computer-based resources identified from each of said service-specific resource pools;

selectively categorize at least some of said resource profiles as static and remaining resource profiles as dynamic;

selectively prioritize dynamic resource profiles over static resource profiles, or said static profiles over said dynamic profiles;

optimize an allocation of only said computer-based resources corresponding to said dynamic resource profiles, by identifying among said service-specific resource pools, at least one computer-based resource best fitting said dynamic resource profiles, in an event said dynamic resource profiles are prioritized over said static resource profiles;

optimize an allocation of only said computer-based resources corresponding to said static resource profiles, by identifying among said service-specific resource pools, at least one computer-based resource best fitting said static resource profiles, in an event said static resource profiles are prioritized over said dynamic resource profiles;

and identify from each of said service-specific resource pools, in response to iterative modifications of said resource profiles, respective computer-based resources satisfying modified resource profiles, and trigger said at least one TSN endpoint to consume said computer-based resources identified based on said iteratively modified resource profiles;

wherein said computer-executable instructions further cause said processor to: selectively facilitate communication between said at least one TSN endpoint and a peer TSN endpoint over said time-sensitive fog network, based at least on fulfillment of at least one predefined communication constraint by said at least one TSN endpoint and said peer TSN endpoint;

route said communication between said at least one TSN endpoint and said peer TSN endpoint through at least some of a plurality of TSN switches embedded within corresponding fog nodes, and wherein said at least some TSN switches are selected based at least on said at least one communication constraint;

iteratively search said plurality of service-specific resource pools, for said service specific computer-based resources satisfying said resource profiles and said resource constraints corresponding to said resource profiles;

and maintain said at least one TSN endpoint and said peer TSN endpoint in an OFF state, and transform said at least one TSN endpoint and said peer TSN endpoint into an ON state, only in an event said communication between said TSN endpoint and said peer TSN endpoint is determined to satisfy said at least one communication constraint.

* * * * *